(12) United States Patent
Chen et al.

(10) Patent No.: US 7,082,531 B1
(45) Date of Patent: Jul. 25, 2006

(54) METHOD AND APPARATUS FOR DETERMINING ENFORCEMENT SECURITY DEVICES IN A NETWORK TOPOLOGY

(75) Inventors: Shigang Chen, Santa Clara, CA (US); Partha Bhattacharya, Cupertino, CA (US); Liman Wei, Santa Clara, CA (US)

(73) Assignee: Cisco Technology, inc., San Jose, CA (US)

( * ) Notice: Subject to any disclaimer, the term of this patent is extended or adjusted under 35 U.S.C. 154(b) by 746 days.

(21) Appl. No.: 10/006,291

(22) Filed: Nov. 30, 2001

(51) Int. Cl.
*H04L 9/00* (2006.01)
*H04L 12/28* (2006.01)
*G06F 15/173* (2006.01)

(52) U.S. Cl. .................. 713/153; 709/238; 709/242; 370/254; 370/255; 370/256

(58) Field of Classification Search ........ 709/238–239, 709/223–226, 243–244; 713/200–201
See application file for complete search history.

(56) References Cited

U.S. PATENT DOCUMENTS

| | | | |
|---|---|---|---|
| 5,825,772 A | | 10/1998 | Dobbins et al. |
| 5,881,243 A | * | 3/1999 | Zaumen et al. ............ 709/241 |
| 6,084,858 A | * | 7/2000 | Matthews et al. ......... 370/238 |
| 6,115,753 A | | 9/2000 | Joens |
| 6,167,444 A | | 12/2000 | Boden et al. |
| 6,185,619 B1 | | 2/2001 | Joffe et al. |
| 6,225,999 B1 | | 5/2001 | Jain et al. |
| 6,246,689 B1 | | 6/2001 | Shavitt |
| 6,256,295 B1 | * | 7/2001 | Callon ....................... 370/254 |
| 6,286,038 B1 | | 9/2001 | Reichmeyer |
| 6,298,044 B1 | | 10/2001 | Britt |
| 6,412,000 B1 | | 6/2002 | Riddle et al. |
| 6,484,261 B1 | | 11/2002 | Wiegel |
| 6,502,131 B1 | | 12/2002 | Vaid et al. |
| 6,633,915 B1 | | 10/2003 | Hashimoto |
| 6,646,989 B1 | | 11/2003 | Khotimsky et al. |
| 6,697,338 B1 | | 2/2004 | Breitbart et al. |
| 6,760,775 B1 | | 7/2004 | Anerousis et al. |
| 6,857,026 B1 | * | 2/2005 | Cain ........................ 709/239 |
| 6,871,284 B1 | | 3/2005 | Cooper et al. |
| 6,909,709 B1 | | 6/2005 | Mesiwala |
| 2002/0062359 A1 | | 5/2002 | Klopp et al. |
| 2002/0161888 A1 | * | 10/2002 | McGuire ................... 709/226 |
| 2003/0016679 A1 | * | 1/2003 | Adams et al. ............. 370/401 |
| 2003/0070070 A1 | | 4/2003 | Yeager et al. |
| 2003/0172145 A1 | | 9/2003 | Nguyen |

(Continued)

OTHER PUBLICATIONS

Cormen et al,"Introduction to Algorithms", 1990,McGraw-Hill Book Company, pp. 465 and 477-485.*

(Continued)

*Primary Examiner*—Hosuk Song
*Assistant Examiner*—Ponnoreay Pich
(74) *Attorney, Agent, or Firm*—Hickman Palermo Truong & Becker, LLP (57) ABSTRACT

Enforcement firewalls and other security devices are located on a network for a given source node and destination node. Nodes in the network topology are programmatically identified as being part of a non-looping communication path between the source node and the destination node. These nodes may be part of a path closure set. Security devices that are part of the path closure set are identified as the enforcement security devices for the given source and destination node.

12 Claims, 5 Drawing Sheets

U.S. PATENT DOCUMENTS

2004/0030796 A1    2/2004    Cooper et al.
2005/0086300 A1    4/2005    Yeager
2005/0105524 A1    5/2005    Stevens et al.

OTHER PUBLICATIONS http://www.cs.oberlin.edu/classes/dragn/labs/greedy/greedy0.html (last visited: Apr. 7, 2005).* http://www.cee.hw.ac.uk/~alison/ai3notes/paragraph2_6_2_1_0_1.html (last visited: Apr. 7, 2005).* http://www2.toki.or.id/book/AlgDesignManual/BOOK/BOOK2/NODE65.HTM (last visited: Apr. 7, 2005).*

Garcia-Luna-Aceves et al, "A Path-Finding Algorithm for Loop-Free Routing", Feb. 1997, IEEE/ACM Transaction s on Networking, vol. 5.*

Garcia-Luna-Aceves et al, "Distributed, Scalable Routing Based on Vectors of Link States", Oct. 1995, IEEE Journal on Selected Areas in Communications, vol. 13, No. 8, pp. 1383-1395.*

Cisco Systems, "Cisco Secure Policy Manager2.3," Cisco Systems Data Sheet, Copyright 1992-2001, pp. 1-6.

U.S. Appl. No. 10/197,301, filed Jul. 15, 2002.

U.S. Appl. No. 09/872,056, filed May 31, 2001.

* cited by examiner

METHOD AND APPARATUS FOR DETERMINING ENFORCEMENT SECURITY DEVICES IN A NETWORK TOPOLOGY

FIELD OF THE INVENTION

The present invention generally relates to security policies for networks. The invention relates more specifically to a method and apparatus for determining enforcement security devices in a network topology.

BACKGROUND OF THE INVENTION

In policy-based security management, as applied in computer networks, the user inputs a network topology and a list of end-to-end security policies to a policy manager. Each security policy regulates how packets from a source network object to a destination network object are to be treated. In particular, each security policy determines whether packets between the source and destination nodes will be denied or permitted, and if permitted, under what conditions. The topology describes the arrangement of network devices.

Security management software is typically operated on a policy server that enforces a security policy specified by the user. An example of security management software is CISCO SECURE POLICY MANAGER (CSPM). The security management software implements security policies on devices in the network, including security devices and firewalls that may be located on the network.

In the case where static routing is used to connect a source and destination node, enforcing a security policy is simple. Static routing usually results in only one communication path existing between the source node and the destination node. The security policy is implemented on firewalls on that communication path.

More typically, dynamic routing is used to connect the source node to the destination node. In dynamic routing, there may be numerous communication paths between the source node and destination node. In this case, the most conservative implementation of a security policy is to configure all enforcement firewalls using the policy, so that the policy is enforced on every possible routing path from the source node to the destination node.

In the case where dynamic routing is used, it is typically a challenging task to efficiently identify all enforcement firewalls that may potentially need to implement a security policy between a given source node and destination node. One current approach uses a "brute-force" methodology to find all possible paths between the source and destination nodes. Then, every path is examined to identify enforcement firewalls for the source and destination node. The "brute-force" approach is very computationally extensive, and has an exponential complexity when all paths between the source and destination nodes are computed. For example, it can take days for a policy server to determine all possible communication paths between a source node and destination node for a network having thousands of nodes.

Another approach is to use skilled technicians who can locate enforcement firewalls. The skilled technician may manually reduce redundant paths to minimize the number of firewalls in use. Because the approach is manual, it requires overhead and costs associated with employing experienced technicians. Furthermore, this kind of approach is not automated.

Based on the foregoing, there is a clear need for an efficient and automated approach for identifying enforcement firewalls that may potentially need to enforce a security policy in a network topology for a given source and destination node.

SUMMARY OF THE INVENTION

The foregoing needs, and other needs and objects that will become apparent for the following description, are achieved in the present invention, which comprises, in one aspect, a method for determining enforcement security devices in a network.

In an embodiment, a source node and a destination node are identified for a network topology. The source and destination nodes are end points for traffic that is to be sent through the network topology. Nodes in a path closure set are programmatically identified for that source node and destination node. Enforcement security devices are identified from the path closure set.

In other aspects, the invention encompasses a computer apparatus, a computer readable medium, and a carrier wave configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for determining enforcement firewalls in a network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 OVERVIEW
    1.1 TERMINOLOGY
    1.2 GENERAL DESCRIPTION
  2.0 NETWORK DESCRIPTION
  3.0 IMPLEMENTATION ARCHITECTURE 4.0 FUNCTIONAL DESCRIPTION
5.0 HARDWARE OVERIVEW
6.0 EXTENSIONS AND ALTERNATIVES
1.0 OVERVIEW Embodiments of the invention provide an efficient method for determining enforcement security devices between a given source and destination node on a network topology. A security policy can then be implemented on the network using selected enforcement security devices that effectively regulate all traffic between a given source and destination node.

1.1 TERMINOLOGY

A "security device" is any device that can regulate traffic on a network, including denying or permitting packets of data. A security device may also include any device that will permit data packets to proceed to a destination under certain conditions. Security devices may include firewalls.

The term "enforcement security device" means a security device that affects communications between a specified source and destination node. Enforcement security devices may be configured to enforce a security policy that is specific to a source and destination.

The term "node" refers to one or more elements on a network that can be treated as having no internal topology for purposes of implementing a security policy. Examples of nodes on a network include firewalls, sub-networks ("subnets"), switches, gateways, hubs, and routers.

A "path closure set" refers to a select set of nodes between a source node and a destination node. Each node in a path closure set is part of a communication path between the source and destination. When traffic between a source node and destination node is dynamically routed, the path closure set represents a subset of nodes in the network topology that can form part of a non-looping path between the source node and destination node.

The term "adjacent node" means a node that directly communicates with another node. Adjacent nodes will exchange communications without any intermediate nodes.

The term "programmatically" means through use of programming or logic. Programmatically performed steps are automatic, and may involve one or more software elements, hardware elements, or a combination thereof.

The term "traverse" means that traffic passes from one node to another adjacent node. The term "forward traverse" means (i) a first node is forwarding traffic to an adjacent second node, and (ii) the first node did not receive the traffic from the second node before forwarding that traffic to the second node.

A "communication path" is a series of nodes that sequentially forward traverse traffic from a source node to a destination node.

A "loop path" is a path formed by forward traversing a sequence of adjacent nodes until one node is determined to repeat itself in the sequence. The sequence of adjacent nodes that form the loop path is not considered to be a communication path, but nodes in the loop path may be part of the path closure set because they are segments of other non-looping communication paths between the source and destination node.

The term "looping" means a path formed by forward traversing a sequence of adjacent nodes that is determined to contain a loop.

A "loop closure node" is a node that is repeated when a loop path is identified.

A "non-looping communication path" is a path that extends between a source and destination node, and has no "loop path" as a part of it. Nodes in a non-looping communication path may be part of looping paths that are identified in the process of identifying non-looping communication paths between a given source and destination node.

The term "link" refers to a connection between two adjacent nodes.

1.2 GENERAL DESCRIPTION

Embodiments of the invention identify nodes in a network topology that are each part of a non-looping communication path between a given source node and a destination node. Such nodes are said to belong to a path closure set. An embodiment identifies all nodes in all non-looping communication paths between the given source and destination node as part of the path closure set. The enforcement security devices are identified from nodes in the path closure set.

Embodiments of the invention describe methodologies for identifying nodes in the path closure set. The steps performed in identifying nodes in the path closure set may result in locating one or more loop paths. A determination is made as to whether nodes in such loop paths are actually part of non-looping paths between the source node and destination node.

According to an embodiment, source and destination nodes are identified for traffic that is to be sent through a network topology. Select nodes in the network topology that are part of a path closure set for that source and destination node are programmatically identified. The enforcement security devices are part of the path closure set.

In an embodiment, a path closure set is identified by traversing all nodes in the network using links that connect adjacent nodes. Located nodes are designated as part of a path closure set if one of three conditions are satisfied for a sequence of adjacent nodes. A first condition states that a sequence of adjacent nodes are part of the path closure set when one of the located nodes is the destination node, and if the resulting path between the source node and the destination node is non-looping.

A second condition and third condition are for looping paths. The second condition states that a sequence of adjacent nodes are part of the path closure set when one of the located nodes is identified as a loop closure node, and if any of the nodes in the sequence other than the loop closure node are already designated as part of the path closure set. The third condition states that a sequence of adjacent nodes are part of the path closure set when one of the located nodes is identified as a loop closure node, and if a selected one of the sequence of nodes, other than the loop closure node, is subsequently designated as part of the path closure set. The selected node may be an adjacent node to the loop closure node.

Embodiments of the invention provide several advantages over other known solutions. Among these advantages, enforcement firewalls and other security devices may be located automatically, without the need for skilled manual intervention. The need to check each path through the network topology is also avoided. Consequently, embodiments of the invention are effective as a network topology is scaled up to include many additional nodes.

According to an embodiment, the amount of time required to locate enforcement firewalls and other security devices depends only on the size of the network topology, and in particular, on the number of links between nodes in the network topology.

2.0 NETWORK DESCRIPTION

Figure 1A:
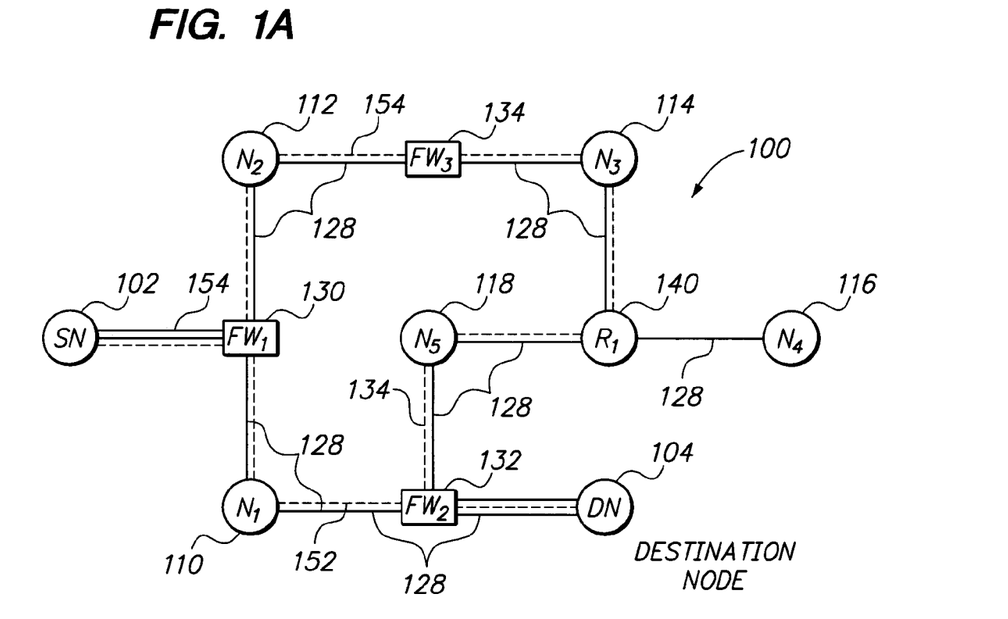
FIG. 1A is a simplified example of a network topology having identifiable nodes for determining enforcement firewalls.

FIG. 1A is a simplified example of a network topology having identifiable nodes for determining enforcement firewalls and other security devices. A network 100 includes a plurality of nodes, including a source node 102 and a destination node 104. Other nodes in network 100 include sub-networks, routers and firewalls. As will be described, a security policy for regulating traffic between source node 102 and destination node 104 is implemented only on enforcement firewalls between the source node 102 and destination node 104.

In an embodiment, enforcement firewalls are identified from among all firewalls on the network 100. Traffic between the source node 102 and destination node 104 is regulated by the security policy implemented only on the corresponding enforcement firewalls.

Embodiments of the invention enable the enforcement firewalls on network 100 to be efficiently located, so that the security policy for regulating traffic between source node 102 and destination node 104 is implemented only on the enforcement firewalls, and not on extraneous firewalls that are part of network 100. A path closure set of nodes is identified from nodes on the network topology. The path closure set contains the nodes of all non-looping communication paths between the source node 102 and the destination node 104.

According to an embodiment, the nodes of the path closure set are identified by locating each node in the network topology, and by making a determination as to whether a path containing each located node is part of the path closure set. The individual nodes may be located by traversing the network through a series of sequentially adjacent nodes. A policy server 210 (FIG. 2) may be used to traverse among the nodes in network 100. By traversing the network 100 using adjacent nodes, policy server 210 is able to identify several paths between the source and destination nodes 102, 104. If specified conditions are met as a path is formed, nodes in that path are designated to be part of the path closure set. When the entire network topology is checked, then nodes in the path closure set corresponding to firewalls are identified as the enforcement firewalls.

One methodology for traversing network 100 is to locate nodes using a "depth-first" search. In the depth-first search, nodes are located in a sequence derived from forward traversing from one adjacent node to another adjacent node. A tentative path is constructed as a list of traversed nodes. In such a sequence, nodes may be encountered that have no other adjacent nodes to maintain the forward traversal. These nodes may be referred to as end nodes. When either an end node or destination node 104 is encountered, the traversal is backtracked until a previous node in the sequence is encountered having an adjacent node that was not previously located. The forward traversal is resumed for the sequence using the first unchecked adjacent node encountered when backtracking from the end node or destination node 104. Nodes that were encountered during the backtrack are removed from the tentative path that was being formed from the sequence of nodes in the forward traversal. If no unchecked, adjacent nodes remain, then all nodes in network 100 have been checked, and the path is finalized.

Nodes that are adjacent to one another are linked. Each incremental traversal across network 100 locates a node that is linked to the node that was previously located. Each located node is linked to an adjacent, previously located node. A next node is adjacent and linked to the located node, and will be checked in the next increment. After the next increment, the next node becomes the located node. If for any located node, the next node is the previous node, then that node is an end node. For example, at the increment where the located node is a first firewall 130, the previous node is the source node 102. Depending on the direction of the forward traversal, the next node is either a first sub-network 110, or a second sub-network 112.

In FIG. 1A, a plurality of links 128 connect adjacent nodes of network 100. Traversing from source node 102 to destination node 104 may identify several communication paths formed by a sequence of adjacent or linked nodes. From source node 102, a first path 152 may be identified that connects source node 102 and destination node 104. The first path 152 is formed by a sequence of adjacent nodes that consist of first firewall 130, first sub-network 110, a second firewall 132 and to destination node 104.

The first path 152 satisfies a first condition for designating nodes as part of the path closure set. The first condition states that the nodes of a path formed by forward traversing across the network 100 are designated as being part of the path closure set if one of the nodes encountered during the forward traversal is the destination node 104, and if the path formed is non-looping. Because the first condition is satisfied, the nodes of the first path 152 are identified as belonging to the path closure set.

Once destination node 104 is identified, implementing the depth-first methodology requires policy server 210 (FIG. 2) to backtrack previously located nodes, until an unchecked adjacent node is encountered. In FIG. 1A, first firewall 130 and second firewall 132 each have two adjacent nodes. Backtracking from destination node 104, second firewall 132 is identified as having an unchecked adjacent node-corresponding to fifth sub-network 118. A second path 154 may be identified by forward traversing sequential nodes from second firewall 132. Nodes encountered by backtracking from destination node 104 to second firewall 132 are not considered part of the second path 154. But nodes used to forward traverse to second firewall 132 from source node 102 are part of both first path 152 and second path 154. By forward traversing from second firewall 132, the located nodes that are sequentially identified are fifth sub-network 118, first router 140, third sub-network 114, third firewall 134, second sub-network 112, first firewall 130, first sub-network 110, and second firewall 132.

When the policy server 210 (FIG. 2) encounters second firewall 132 again, it recognizes the second firewall as a loop closure node. The sequence of second firewall 132, fifth sub-network 118, router 140, third sub-network 114, third firewall 134, second sub-network 112, first firewall 130, and first sub-network 110 are a loop path. Second path 154 includes that loop path. Nodes in a loop path are part of the path closure set if a second condition is satisfied. The second condition states that nodes in a loop path are part of the path closure set if at least one node other than the loop closure node is already part of the path closure set. In FIG. 1A, for example, several nodes in the loop path of second path 154 are part of the path closure set, including first sub-network 110 and first firewall 130.

Another path may be identified by back tracking from second firewall 132 to first firewall 130. But second sub-network 112 has been checked, so the traversal is not performed. First router 140 also has an unchecked adjacent node, corresponding to fourth sub-node 116. But this node is an end node. Therefore, it is not part of the path closure set.

In FIG. 1A, application of the first and second conditions results in creating a path closure set including information identifying first firewall 130, second firewall 132, third firewall 134, first sub-network 110, second sub-network 112, third sub-network 114, fifth sub-network 120 and first router 140. Only fourth sub-network 116 is not part of the path closure set. There are two non-looping communication paths in network 100. The first non-looping communication path corresponds to first path 152, as it extends between source node 102 and destination node 104 without looping. The second non-looping communication path may be derived from second path 154, and includes nodes identified by forward traversing from source node 102, first firewall 130, second sub-network 112, third firewall 134, third sub-network 134, first router 140, fifth sub-network 118, second firewall 132 and destination node 104. Therefore, the second non-looping path communication path does not include first sub-network 110.

Firewalls and other security devices in the path closure set correspond to the enforcement security devices for source and destination nodes 102, 104. Therefore, in FIG. 1A first firewall 130, second firewall 132 and third firewall 134 are enforcement firewalls. Any firewalls located past a portion of the network provided by sub-network 116 would not be considered enforcement firewalls.

In FIG. 1A, the path closure set was determined using the first two conditions because the first path 152 was identified before the second path 154. If the second path 154 was identified before first path 152, the second condition would not have yielded nodes in the second path 154 as being part of the path closure set. Therefore, a third condition is required to determine whether nodes in a loop path are part of the path closure set when no nodes in the loop path are, at the time the loop path is identified, already designated as being part of the path closure set.

Figure 1B:
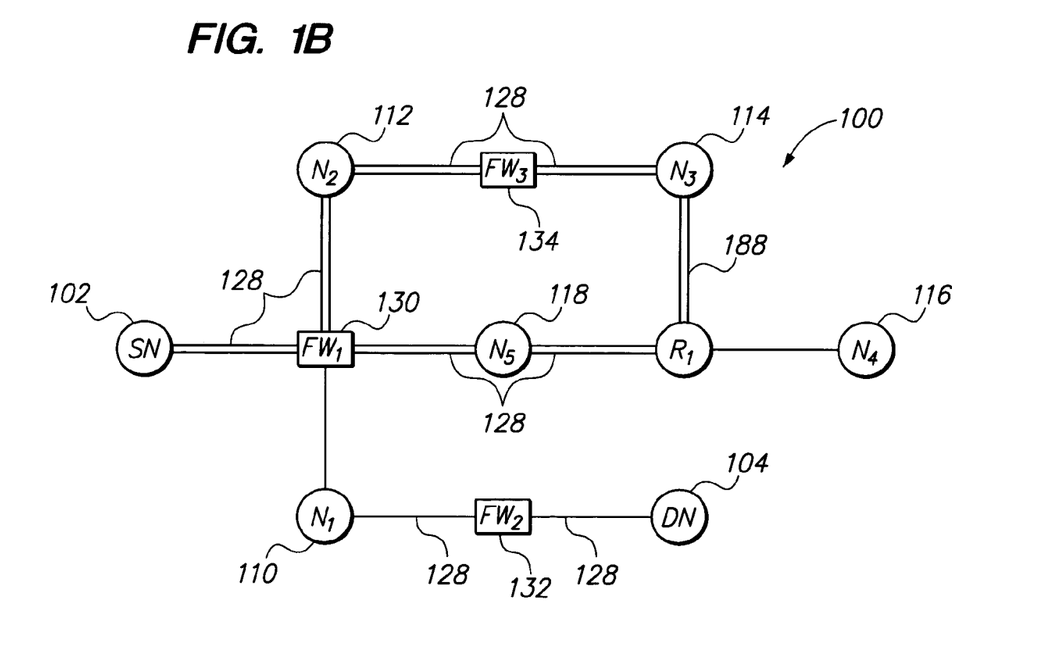
FIG. 1B is another simplified example of a network topology having identifiable nodes for determining enforcement firewalls.

FIG. 1B is another simplified example of a network topology having identifiable nodes for determining enforcement firewalls. In FIG. 1B, network 100 is altered from FIG. 1A by severing a link between second firewall 132 and fifth sub-network 118, and by making a new link between fifth sub-network 118 and first firewall 130. As such, fifth sub-network 118 is not adjacent to second firewall 132. Forward traversing from source node 102 may identify nodes of third path 156. The third path 156 contains second sub-network 112, third firewall 134, third sub-network 114, first router 140, and fifth sub-network 118. The first firewall 130 is its loop closure node.

In an example provided by FIG. 1B, the set of path closure nodes is identified using a third condition. The third condition states that if a loop closure node is encountered, and the second condition does not apply, then the first node that follows the loop closure node is flagged. The loop closure node is first firewall 130. The first node that follows the loop closure node is, for a given direction, second sub-network 112. Therefore, second sub-network 112 is flagged.

After third path 156 is identified, depth-first method is continued on network 100. From first firewall 130, first sub-network 110, second firewall 132 and destination node 104 are identified as first path 152. Since first path is a non-looping communication path between source node 102 and destination node 104, all nodes in first path 152 are part of the path closure set. After first path 152 is identified, there are no other paths that provide nodes for the path closure set under the first two conditions. Therefore, for this scenario, after all nodes in network 100 are checked, fifth sub-network 118 is not identified as part of the path closure set. Accordingly, the path closure set for network 100 as depicted in FIG. 1B consists of nodes in first path 152. Only the loop closure node in third path 156, corresponding to first firewall 130, is a part of the path closure set, because that node is also part of first path 152. From the path closure set, it can be determined that the enforcement firewalls are first firewall 130 and second firewall 132, but not third firewall 134.

One advantage provided by the three conditions described with FIG. 1A and FIG. 1B is that the path closure set may be determined in a linear duration of time. That is, the path closure set for a network topology may be determined in a duration that is proportional to the number of links 128 between all adjacent nodes of the network 100.

3.0 IMPLEMENTATION ARCHITECTURE

Figure 2:
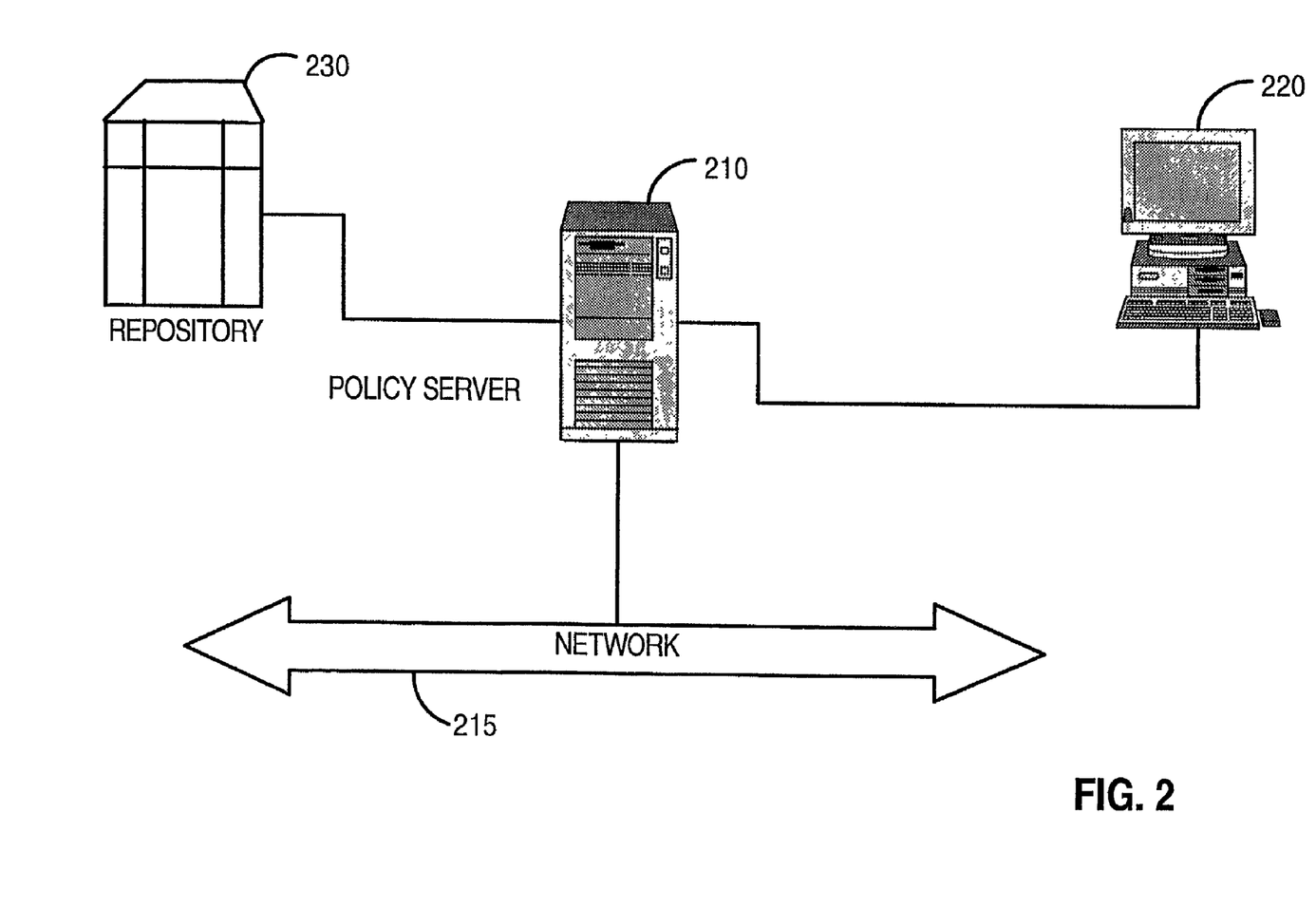
FIG. 2 illustrates components for identifying enforcement firewalls and implementing a security policy on the enforcement firewalls.

FIG. 2 is a block diagram showing a system for identifying enforcement firewalls and implementing a security policy on the enforcement firewalls. The system includes a policy server 210 and a repository 230. The system also includes a terminal 220 to operate policy server 210. The policy server 210 may access network 100 (FIG. 1A and FIG. 1B) through a network channel 215.

In an embodiment, policy server 210 executes instructions to identify enforcement firewalls on network 100. This includes instructions for identifying nodes in network 100 that are part of the path closure set. As described, the path closure set may be identified by traversing a sequence of adjacent nodes sequentially using policy server 210, and determining if the sequence of adjacent nodes satisfy one of three conditions. The policy server 210 may also execute instructions for implementing security policies on the enforcement firewalls.

4.0 FUNCTIONAL DESCRIPTION

Figure 3:
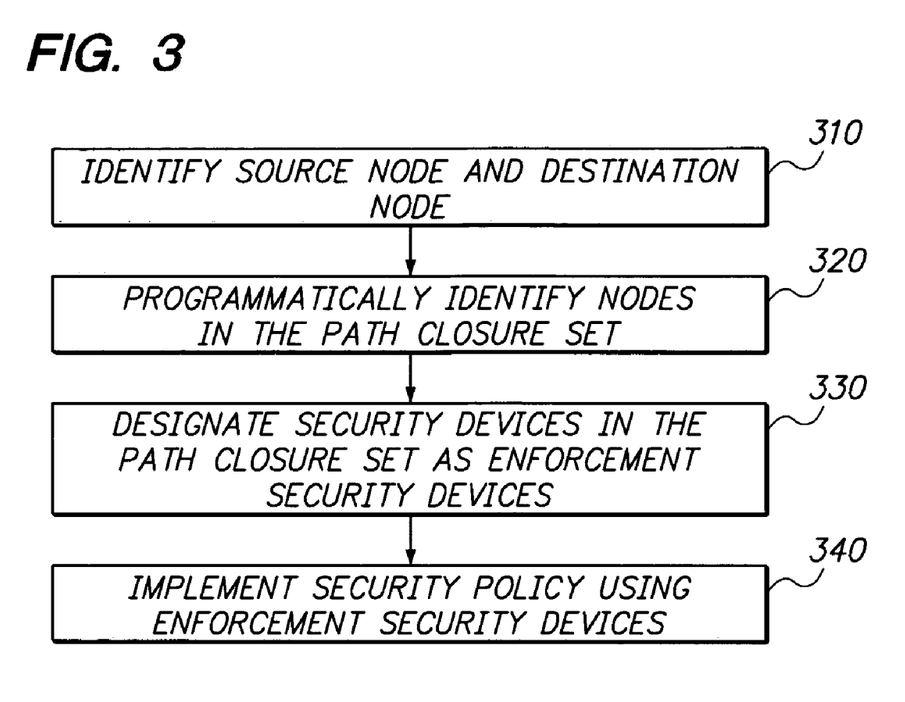
FIG. 3 is a flow chart that illustrates a method for implementing a security policy on a network using enforcement firewalls and other security devices for a given source and destination node.

FIG. 3 illustrates a method for implementing a security policy on a network using enforcement firewalls and other security devices for a given source and destination node. The method may be implemented on, for example, network 100 (FIG. 1A and FIG. 1B), using policy server 200 (FIG. 2).

In step 310, a source node and a destination node are identified for specified traffic across a network. The source node and destination node may be identified by a user. For example, the user of policy server 200 may specify the source node and destination node in which a security policy is to be implemented.

In step 320, nodes belonging to the path closure set are programmatically identified. In one embodiment, each node in the network is checked, and the nodes of the path closure set correspond to a subset of all nodes in the network. Each node in the network may be checked using a computer-implemented methodology to determine if that node satisfies a criteria for being in the path closure set. The criteria may correspond to one of the three conditions described with FIG. 1A and FIG. 1B. One methodology by which each node is checked is a depth-first search. Other methodologies may also be used, such as Dijkstra's algorithm and Bellman-Ford's algorithm.

In step 330, security devices that are included in the path closure set are designated as the enforcement security devices for the specified source and destination nodes.

In step 340, a security policy is implemented on the enforcement firewalls. In one embodiment, only the enforcement firewalls of the network are affected by the security policy. The security policy regulates traffic between the identified source and destination nodes.

Figure 4:
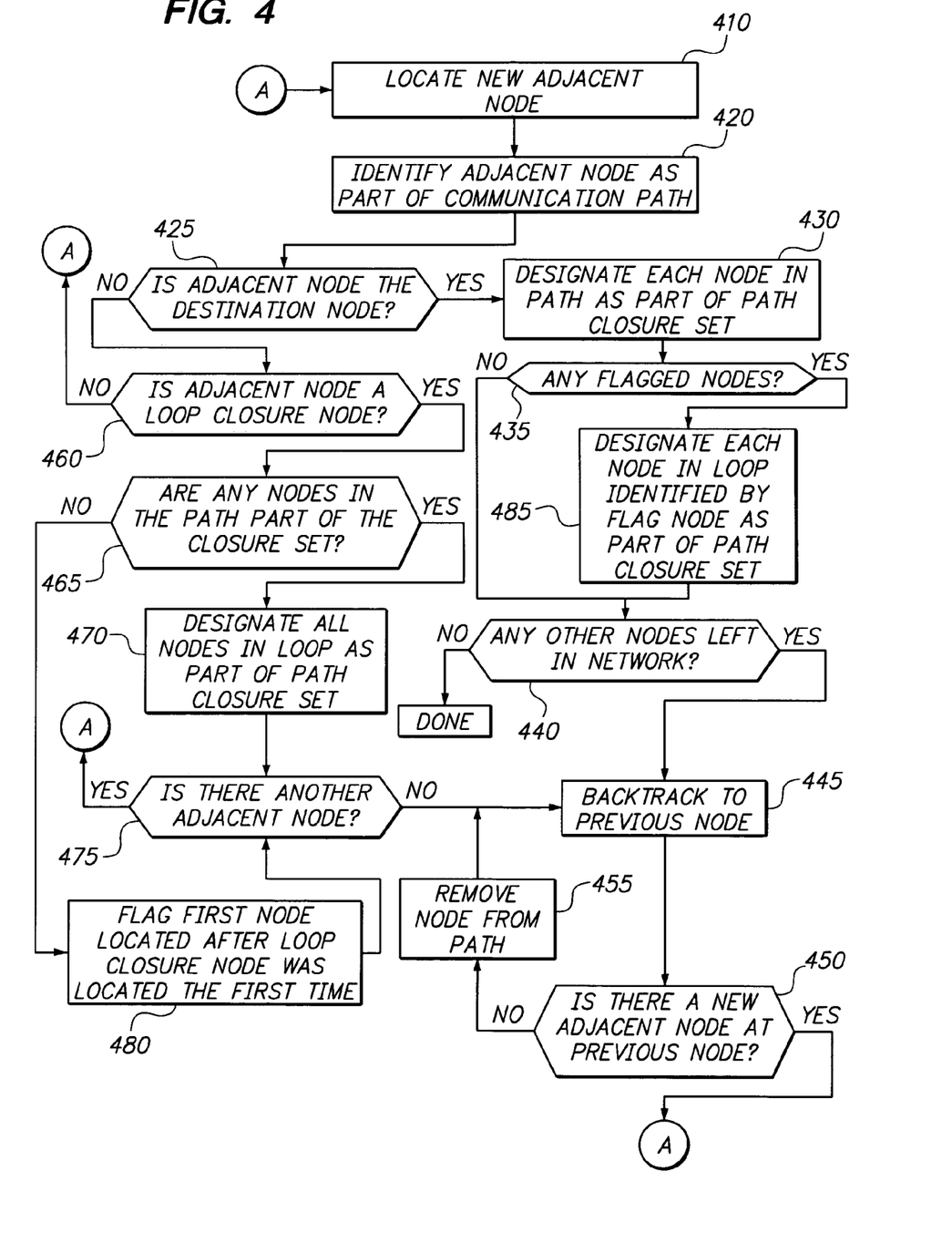
FIG. 4 is a flow chart of a method for identifying nodes in a path closure set.

FIG. 4 illustrates a more detailed method for locating enforcement firewalls and other security devices for a specified source and destination node on a network topology. The enforcement security firewalls may correspond to firewalls that process traffic exchanged between the source and destination nodes. The method may be implemented on, for example, network 100 (FIG. 1A and FIG. 1B), using policy server 200 (FIG. 2).

In step 410, a new adjacent node is located from known node. Initially, the known node is source node 102 (FIG. 1A and FIG. 1B), and the first new adjacent node is adjacent to a source node. As the method forward traverses to other nodes, each new adjacent node is located from a previously located node.

In step 420, a path is identified for each new adjacent node. The path corresponds to a sequence of adjacent nodes. An identified path may or may not be a communication path extending between the source node and the destination node.

In step 425, a determination is made as to whether the adjacent node located in step 410 is the destination node. If the determination in step 425 is that the adjacent node is the destination node then step 430 provides that each node identified as part of the path in step 420 is also designated as being part of a path closure set.

In step 435, a determination is made as to whether there are any flagged nodes. As will be described, flag nodes are nodes in looping paths that are not yet determined as being part of the path closure set. If there are no flagged nodes, the method proceeds with step 440.

In step 440, a determination that follows step 430. In step 440, a determination is made as to whether any nodes are left to be located in the network topology. If the determination is positive, step 445 backtracks to identify a previous node.

Step 450 determines whether there is a new adjacent node located at the previous node. If the determination in step 450 is negative, then step 455 provides that the previous node is removed from the path. Step 445 is repeated, and another previous node is identified.

If the determination in step 450 is positive, then step 410 is repeated for the new adjacent node.

If the determination in step 425 is that the adjacent node is not the destination node, then step 460 makes the determination as to whether the adjacent node is a loop closure node. A loop closure node may correspond to a node in a sequence of adjacent nodes that was previously located and is part of the same path. If the determination in step 460 is negative, then step 410 is repeated. The node for step 440 becomes a previously located node, and a new node is located that is adjacent to the previously located node.

If the determination in step 460 is positive, then step 465 makes a determination as to whether any nodes in the path, other than the node identified in step 460, are part of the path closure set. This determination corresponds to the second condition. For example, if the destination node is found before the loop path, then step 465 provides that nodes in the loop path are checked to determine if any nodes in the loop path, other than the path closure node, are part of the path closure set.

If the determination in step 465 is positive, then step 470 provides that each node in the path is identified as part of the path closure set. This means that a node other than the path closure node is part of the path closure set. Therefore, each node in the loop path is part of the closure set.

Step 475 follows step 470 and makes the determination as to whether there are any adjacent nodes to the path closure node found in step 460. If there are adjacent nodes, step 410 is repeated. If there are no adjacent nodes, then one embodiment provides that the method backtracks to a previous node. Accordingly, the method continues by performing step 445.

If the determination in step 465 is negative, then step 480 provides that the first node located after the path closure node was located the first time is flagged. If this node is subsequently determined to be part of the path closure set, then all nodes in the loop path identified by step 465 are made part of the path closure set. The method proceeds to step 475, to determine whether there are any adjacent nodes to the path closure node found in step 460.

If step 445 determines there are flagged nodes, then step 485 determines if any nodes determined to be part of the path closure set include one of the flagged nodes. If the determination is positive, then step 485 determines that each node in the loop path corresponding to the flagged nodes is made part of the path closure set.

The method repeats step 440 until no nodes remain in the network topology to be checked. Once all nodes are checked, the method is done.

Among other advantages, a method such as detailed by steps 410–485 may be completed in a duration that is linear, or directly proportional, to the number of links between all nodes in the network topology. Thus, the determination of enforcement firewalls and security devices does not become exponentially more extensive. This is in contrast to the "brute-force" method, where every conceivable path between source and destination nodes is determined, including looping paths that have only the path closure node as part of the path closure set.

4.0 HARDWARE OVERVIEW

Figure 5:
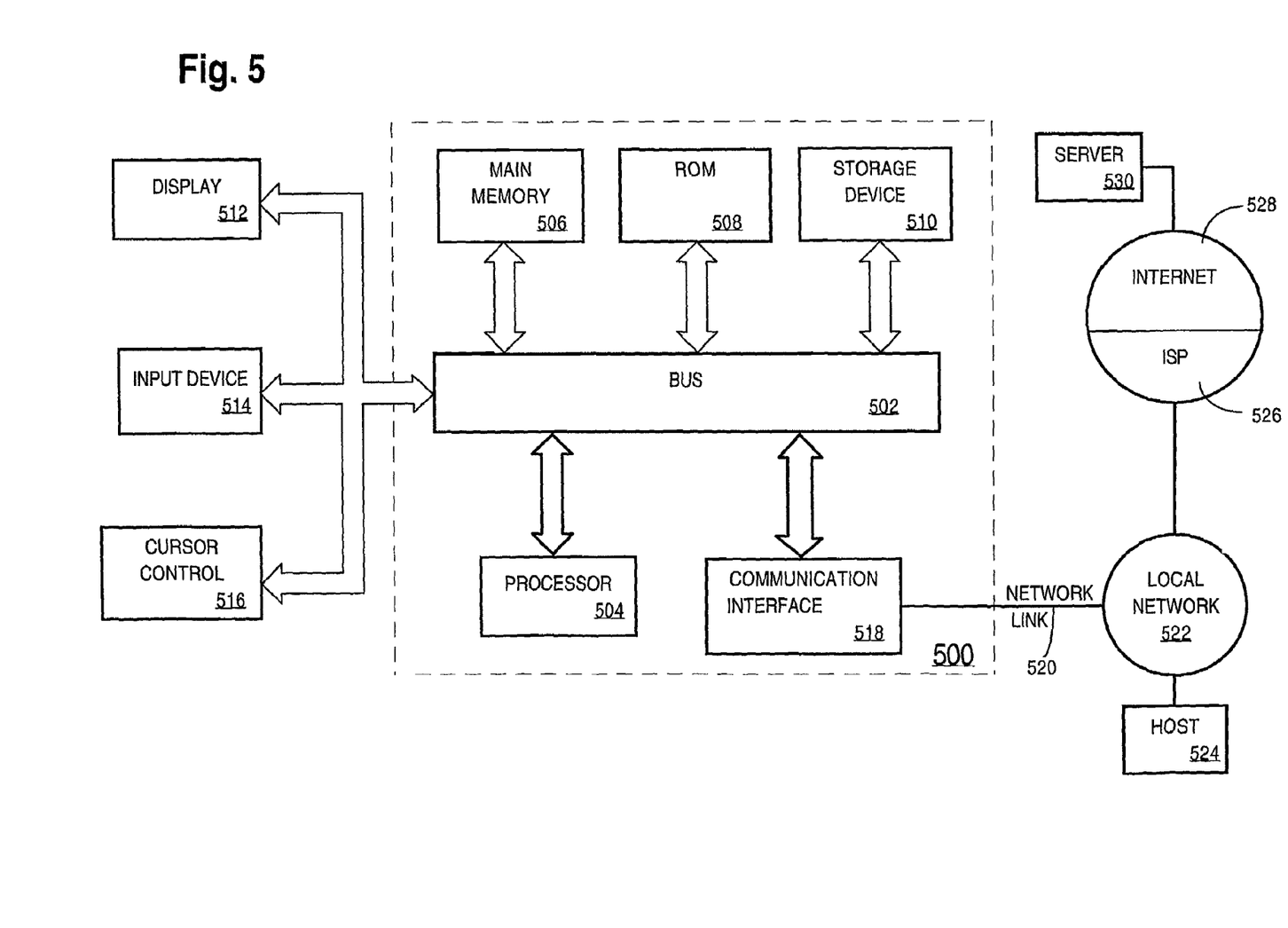
FIG. 5 is a block diagram that illustrates a computer system upon which an embodiment of the invention can be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory ("RAM") or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory ("ROM") 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube ("CRT"), for displaying information to a computer user. An input device 514, including alphanumeric and other keys, is coupled to bus 502 for communicating information and command selections to processor 504. Another type of user input device is cursor control 516, such as a mouse, trackball, stylus, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for determining enforcement firewalls in a network. According to one embodiment of the invention, determining enforcement firewalls in a network is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface 518 may be a local area network ("LAN") card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider ("ISP") 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for determining enforcement security devices on a network, as described herein.

The received code may be executed by processor 504 as it is received, and/or stored in storage device 510, or other non-volatile storage for later execution. In this manner, computer system 500 may obtain application code in the form of a carrier wave.

5.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of determining enforcement security devices in a network topology, the method comprising the computer-implemented steps of:

locating a plurality of adjacent nodes within a sequence of nodes, the plurality of adjacent nodes being between a source node and a destination node in the network topology, each node in the plurality of adjacent nodes having at least two adjacent nodes, including a previous node in the sequence and a next node in the sequence, wherein for each node in the plurality of adjacent nodes, the next node is different than the previous node;

for each particular node in the sequence:

determining if the particular node is the destination node, and if the particular node is the destination node, then identify each node in the sequence as being part of a path closure set for the source node and the destination node;

determining if the particular node is a loop closure node, and if the particular node is a loop closure node, then determining if one or more nodes in the sequence that are part of a loop path defined by the loop closure node are already designated as being part of the path closure set, then designating each node in the loop path as part of the path closure set, else designating each node in the loop path as part of the path closure set if at least a designated node in the loop path is subsequently determined to be part of the path closure set; and identifying one or more enforcement security devices from nodes in the path closure set.

2. A method as recited in claim 1, wherein locating a plurality of adjacent nodes in a sequence includes locating each node in the network topology using the sequence.

3. A method as recited in claim 1, further comprising implementing a security policy on the identified one or more enforcement security devices.

4. A method as recited in claim 1, wherein determining that the particular node is a loop closure node includes determining that the particular node was located as a next node for at least two other nodes in the sequence.

5. A method as recited in claim 1, wherein designating each node in the loop path as part of the path closure set if a designated node in the loop path is subsequently determined to be part of the path closure set includes designating each node in the loop path as part of the path closure set if one of the at least two nodes in the sequence that are adjacent to the loop closure node is subsequently determined to be part of the path closure set.

6. A method as recited in claim 1, wherein locating a plurality of adjacent nodes in a sequence includes locating the plurality of nodes using a depth-first methodology.

7. A computer-implemented method of determining security devices in a network topology, the method comprising:
identifying a source node and a destination node for traffic that is to be sent through the network topology;
for each particular node in the network topology, adding the particular node to a path closure set for the source node and destination node if a determination is made that the particular node is part of a looping sequence of nodes in which (a) at least one node in the looping sequence is already designated as being part of the path closure set and (b) the at least one node designated as being part of the path closure set is not also a loop closure node for that looping sequence; and
storing a list of one or more security devices that occur in the path closure set.

8. A computer-implemented method of determining security devices in a network topology, the method comprising:
identifying a source node and a destination node for traffic that is to be sent through the network topology;
for each particular node in the network topology, adding the particular node to a path closure set for the source node and destination node if a determination is made that the particular node is part of a looping sequence of nodes in which at least one node adjacent to a loop closure node for that looping sequence of nodes is subsequently identified as being part of the path closure set; and
storing a list of one or more security devices that occur in the path closure set.

9. A computer readable medium for determining security devices in a network topology, the computer readable medium carrying instructions for performing the steps of:
identifying a source node and a destination node for traffic that is to be sent through the network topology;
for each particular node in the network topology, adding the particular node to a path closure set for the source node and destination node if a determination is made that the particular node is part of a looping sequence of nodes in which (a) at least one node in the looping sequence is already designated as being part of the path closure set and (b) the at least one node designated as being part of the path closure set is not also a loop closure node for that looping sequence; and
storing a list of one or more security devices that occur in the path closure set.

10. A computer readable medium for determining security devices in a network topology, the computer readable medium carrying instructions for performing the steps of:
identifying a source node and a destination node for traffic that is to be sent through the network topology;
for each particular node in the network topology, adding the particular node to a path closure set for the source node and destination node if a determination is made that the particular node is part of a looping sequence of nodes in which at least one node adjacent to a loop closure node for that looping sequence of nodes is subsequently identified as being part of the path closure set; and
storing a list of one or more security devices that occur in the path closure set.

11. A computer system to determine security devices in a network topology, the computer system comprising:
means for identifying a source node and a destination node for traffic that is to be sent through the network topology;
means for adding, for each particular node in the network topology, the particular node to a path closure set for the source node and destination node if a determination is made that the particular node is part of a looping sequence of nodes in which (a) at least one node in the looping sequence is already designated as being part of the path closure set and (b) the at least one node designated as being part of the path closure set is not also a loop closure node for that looping sequence; and
means for storing a list of one or more security devices that occur in the path closure set.

12. A computer system to determine security devices in a network topology, the computer system comprising:
means for identifying a source node and a destination node for traffic that is to be sent through the network topology;
means for adding, for each particular node in the network topology, the particular node to a path closure set for the source node and destination node if a determination is made that the particular node is part of a looping sequence of nodes in which at least one node adjacent to a loop closure node for that looping sequence of nodes is subsequently identified as being part of the path closure set; and
means for storing a list of one or more security devices that occur in the path closure set.

* * * * *

UNITED STATES PATENT AND TRADEMARK OFFICE
CERTIFICATE OF CORRECTION

| | | |
|---|---|---|
| PATENT NO. | : 7,082,531 B1 | Page 1 of 1 |
| APPLICATION NO. | : 10/006291 | |
| DATED | : July 25, 2006 | |
| INVENTOR(S) | : Shigang Chen et al. | |

It is certified that error appears in the above-identified patent and that said Letters Patent is hereby corrected as shown below:

On the Title Page, Item (73)
(73) Assignee: Delete "Cisco Technology, inc." and insert --Cisco Technology, Inc.--

Col. 12, line 46  After "set," insert

> --and if one or more nodes in the sequence that are part of the loop path defined by the loop closure node are already designated as being part of the path closure set,--

Signed and Sealed this

Eighteenth Day of September, 2007

JON W. DUDAS
*Director of the United States Patent and Trademark Office*